(12) United States Patent  
Asakura et al.

(10) Patent No.: US 8,174,767 B2  
(45) Date of Patent: May 8, 2012

(54) VIEWFINDER AND IMAGING APPARATUS USING THE SAME

(75) Inventors: Ayako Asakura, Hino (JP); Hisashi Goto, Suginami-ku (JP)

(73) Assignee: Olympus Corporation, Tokyo (JP)

(*) Notice: Subject to any disclaimer, the term of this patent is extended or adjusted under 35 U.S.C. 154(b) by 583 days.

(21) Appl. No.: 12/454,680

(22) Filed: May 20, 2009

(65) Prior Publication Data

US 2009/0290863 A1 Nov. 26, 2009

(30) Foreign Application Priority Data

May 21, 2008 (JP) ................................. 2008-132725

(51) Int. Cl.
- *G02B 27/14* (2006.01)
- *G02F 1/1335* (2006.01)
- *H04N 7/00* (2011.01)

(52) U.S. Cl. ........... 359/629; 359/633; 348/115; 349/11

(58) Field of Classification Search .......... 359/629–633, 359/637, 13; 348/115, 335, 369; 349/11; 345/7–9

See application file for complete search history.

(56) References Cited

U.S. PATENT DOCUMENTS 6,396,463 B1* 5/2002 Tomono .......................... 345/8  
6,903,876 B2* 6/2005 Okada et al. .................. 359/633

FOREIGN PATENT DOCUMENTS

JP 2003-204455 7/2003  
JP 2004-045787 2/2004

* cited by examiner

*Primary Examiner* — Dawayne A Pinkney  
(74) *Attorney, Agent, or Firm* — Kenyon & Kenyon LLP

(57) ABSTRACT

The present invention provides a viewfinder, characterized by comprising a reflection type display device on which an object image is displayed, an eyepiece optical system having a front group and a rear group, an illumination optical system for illuminating the reflection type display device and an optical device for putting an optical path taken by the illumination optical system over an optical path from said reflection type display device to the eyepiece optical system at a position of the widest of lens-to-lens spaces in the eyepiece optical system. The eyepiece optical system is located between the reflection type display device and an eye point, and satisfies the following condition (1):

$$0.1 < Y/Dm < 1 \tag{1}$$

where Dm is the widest lens-to-lens space, and Y is the length of the reflection type display device from the center to one side thereof.

18 Claims, 7 Drawing Sheets

Example 1

Example 2

Example 1

Reflection type display device (Display plane:Rectangle)

Reflection type display device (Display plane:Square)

VIEWFINDER AND IMAGING APPARATUS USING THE SAME

This application claims benefit of Japanese Application No. 2008-132725 filed in Japan on May 21, 2008, the contents of which are incorporated by this reference.

BACKGROUND OF THE INVENTION

The invention relates to a viewfinder for viewing an object image displayed on a display device, and an imaging apparatus using the same.

Patent Publication 1 shows a viewfinder in which a polarizing separation device whose refracting power is set substantially at 1 is used between an illumination optical system and an eyepiece optical system, and Patent Publication 2 discloses a viewfinder wherein, of surfaces which form an optical path splitting means and through which light beams pass, at least one is composed of a curved surface.

Patent Publication 1: JP (A) 2004-45787
Patent Publication 2: JP (A) 2003-204455

SUMMARY OF THE INVENTION

The present invention provides a viewfinder, characterized by comprising a reflection type display device on which an object image is displayed, an eyepiece optical system having a front group and a rear group, an illumination optical system for illuminating said reflection type display device and an optical device for putting an optical path taken by said illumination optical system over an optical path from said reflection type display device to said eyepiece optical system at a position of the widest of lens-to-lens spaces in said eyepiece optical system, wherein said eyepiece optical system is located between said reflection type display device and an eye point, and satisfies the following condition (1):

$$0.1 < Y/Dm < 1 \quad (1)$$

where Dm is said widest lens-to-lens space, and
Y is the length of said reflection type display device from the center to one side.

The present invention also provides an imaging apparatus characterized by comprising an imaging device, a controller adapted to convert image information obtained from said imaging device into displayable signals, and a viewfinder adapted to guide an image displayed on said image display device to a viewer's eye, wherein the above viewing optical system is used as said viewfinder.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Some embodiments of the inventive optical system are now explained. In what follows, it should be noted that an eye point E refers to a position (the position of a virtual stop S) where the farthest off-axis light beam leaving the reflection type display device passes full through the virtual stop S of $\phi 4$. At this position, the diameter of the farthest off-axis light beam is substantially in coincidence with the diameter ($\phi 4$) of an aperture in the virtual stop S. It should also be noted that an eye point distance EP refers to a distance from the lens surface located in the viewing optical system (eyepiece lens) and nearest to an eye point side to the eye point (see FIG. 8).

Figure 8:
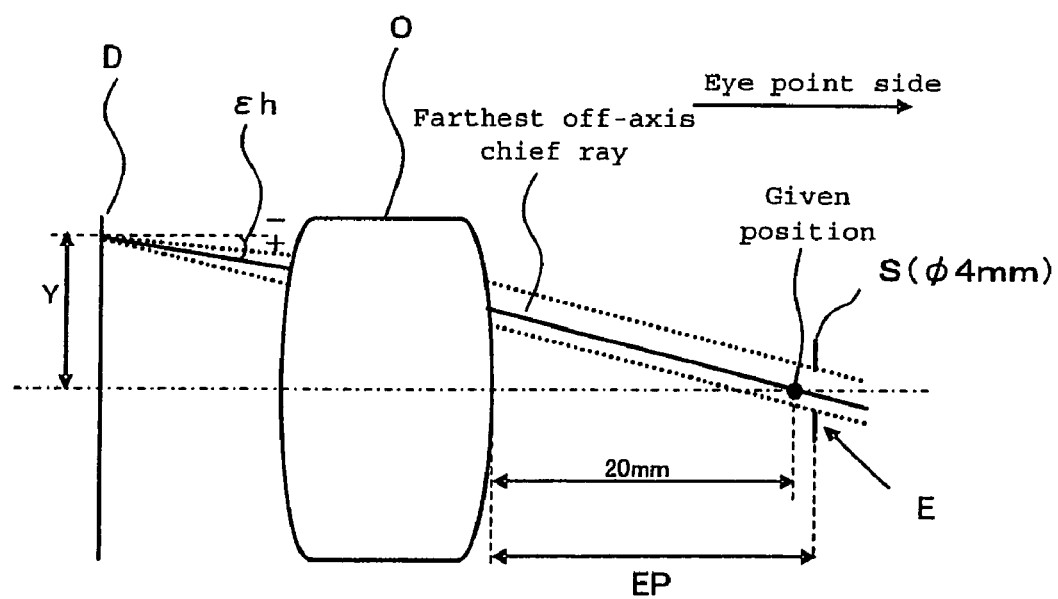
FIG. 8 is illustrative of condition (3).

It should be noted that in FIG. 8, the given position is off the position of the eye point (virtual stop): the eye point distance is 20 mm longer. However, the given position may be in coincidence with the position of the eye point (virtual stop). When the given position is different from the eye point position, there is a difference in width between the upper and lower light beams at that eye point position. When the given position is identical with the eye point position, the widths of the upper and lower light beams are going to be equal at the eye point position.

The viewfinder here comprises a reflection type display device on which an object image is displayed, an eyepiece optical system having a front group and a rear group, an illumination optical system for illuminating said reflection type display device and an optical device for putting an optical path taken by said illumination optical system over an optical path from said reflection type display device to said eyepiece optical system at a position of the widest of lens-to-lens spaces in said eyepiece optical system, wherein said eyepiece optical system is located between said reflection type display device and an eye point.

And the inventive viewing optical system of such arrangement as described above satisfies the following condition (1).

$$0.1 < Y/Dm < 1 \quad (1)$$

Figure 7A:
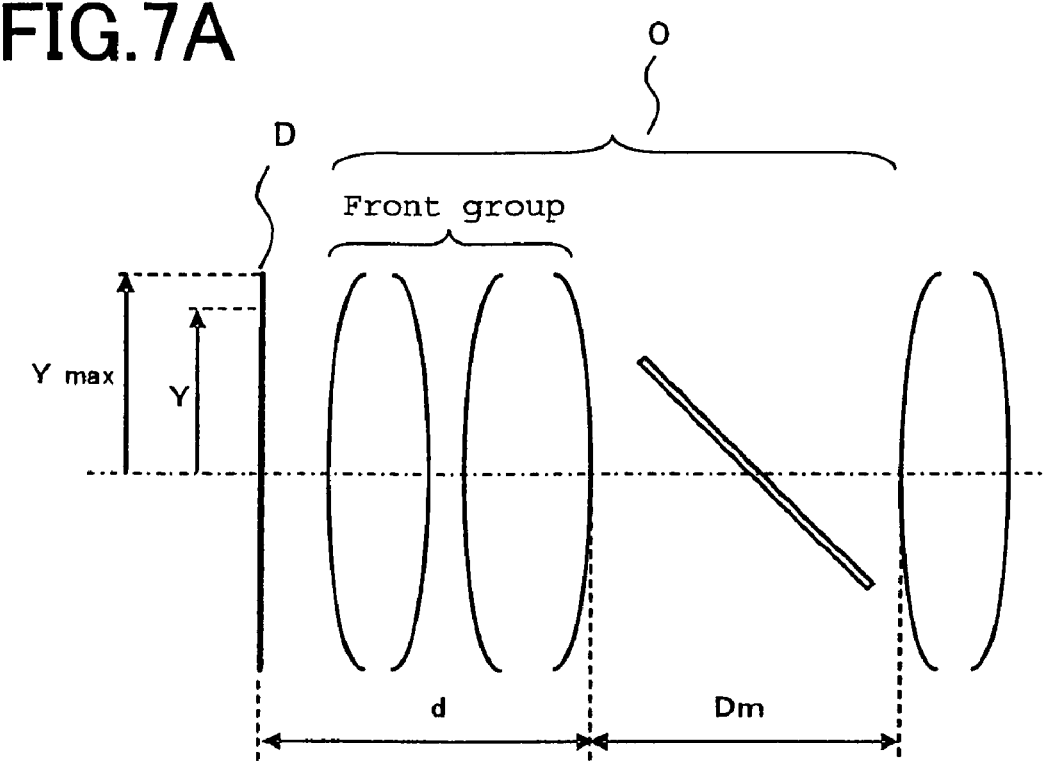
FIG. 7(a) is illustrative of Condition (1)
Figure 7B:
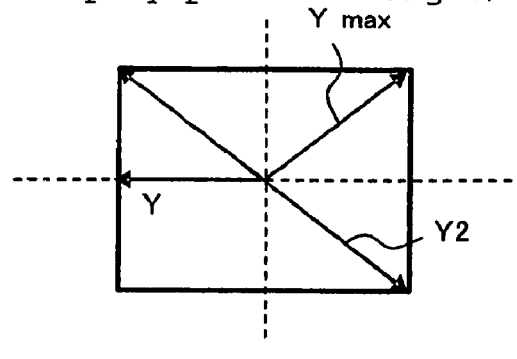
FIG. 7(b) is illustrative of Condition (2).
Figure 7B:
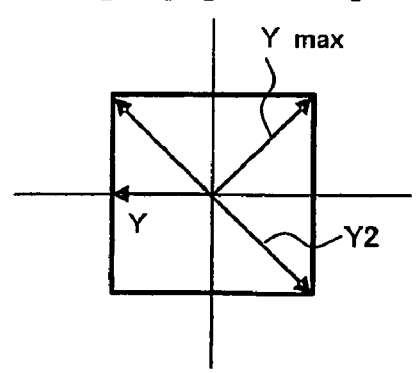

Here Dm is the widest lens-to-lens space, and
Y is the length of said reflection type display device from the center to one side thereof (see FIGS. 7(a) and 7(b)).

The viewfinder here is constructed of the reflection type display device, the front group, the optical device for putting the optical paths one upon another (hereinafter called simply the optical device) and the rear group. Such construction allows the optical system to decrease in size and have a wide angle of field, and enables an adequate eye point to be gained as well. In addition, aberrations can be corrected in a well balanced state, and astigmatism in particular can be reduced.

Being short of the lower limit of 0.1 to Condition (1) causes the widest lens-to-lens space Dm to grow too wide. This is not preferable because difficulty is encountered in keeping astigmatism from occurring. Exceeding the upper limit of 1 to Condition (1) is again not preferable because difficulty is experienced in setting up an optical system with optical devices and lenses (lens groups). This is also not preferable in that there are flares resulting from the optical devices, which may in turn cause the performance of the optical system to deteriorate.

Preferably in the viewfinder here, lenses forming the eyepiece optical system comprise coaxial lenses.

Use of the coaxial lenses enables the optical system to be set up without recourse to a free-form surface (rotational asymmetric surface or the like). This in turn makes it easy to process lenses forming the optical system, and to lower the height of the optical system (size in the direction vertical to the optical axis) as well.

Preferably in the viewfinder here, the front group is constructed of a lens positioned on a reflection type display device side with respect to the optical device, with the satisfaction of the following condition (2).

$$0.1 < Y\max/d < 1.5 \quad (2)$$

Here d is the distance between the reflection type display device and the lens surface located in the front group and nearest to the optical device side, and Ymax is half the diagonal length of the reflection type display device (see FIGS. 7(a) and 7(b)).

The above construction, combined with the satisfaction of Condition (2), enables aberrations to be well corrected, and keep coma in particular from occurring.

Being short of the lower limit of 0.1 to Condition (2) is not preferable, because difficulty is encountered in holding back physical interferences between the lenses and the reflection type display device, and flares occurring at optical surfaces between the lenses and the reflection type display device.

As the upper limit of 1.5 to Condition (2) is exceeded, there is an increasing area in the front group, where light beams from the reflection type display device overlap. This is not preferable because difficulty is experienced in correction of coma in particular.

For the viewfinder here, it is preferable to satisfy the following condition (3).

$$0° < \epsilon h < 20° \quad (3)$$

Here εh is an exit angle (°) of the farthest off-axis chief ray on the reflection type optical device provided that the farthest off-axis chief ray is the outermost of off-axis chief rays that intersect the optical axis of the eyepiece optical system at the given position, and the given position is 20 mm spaced away from the lens surface located in the eyepiece optical system and nearest to the eye point side toward the eye point side (see FIG. 8). Note here that the clockwise direction from a reference position is plus, and the counterclockwise direction is minus.

By the satisfaction of Condition (3), it is possible to keep the optimum eye point distance so that the size of the optical system can be reduced.

As the lower limit of 0° to Condition (3) is not reached, it causes the range of light rays from the reflection type display device to grow wide. This is not preferable because the outer diameter of the optical system grows large.

As the upper limit of 20° to Condition (3) is exceeded, it causes the range of light rays from the reflection type display device to turn too inward. This is not preferable because to make sure the eye point distance, the optical system must have a longer total length.

For the viewfinder here, it is preferable to satisfy the following condition (4).

$$30 < \tan^{-1}(Y2/f) < 47 \quad (4)$$

Here Y2 is the diagonal length of the reflection type display device, and f is the focal length of the whole eyepiece optical system.

As the lower limit of 30 to Condition (4) is not reached, it causes the field of view to become narrow. This is not preferable because of the inability to increase resolution from constraints on the eye's resolving power.

As the upper limit of 47 to Condition (4) is exceeded, it causes the focal length of the whole eyepiece optical system to become short relative to the reflection type display device. This is not preferable because there is no sensible tradeoff offered between making sure the maximum lens-to-lens space Dm and correction of coma or the like.

For the viewfinder here, it is preferable to satisfy the following condition (4).

$$13 \text{ mm} < EP < 40 \text{ mm} \quad (4)$$

Here EP is the eye point distance that is a distance in mm from the lens surface located in the eyepiece optical system and nearest to the eye point side to the eye point.

As the lower limit of 13 to Condition (5) is not reached, there is no separation occurring between the center light beam and the peripheral light beam at the positive lens nearest to the eye point (for instance, the rear group). This is not preferable because it is difficult to offer a sensible tradeoff between center performance and peripheral performance. This is also not preferable for the reason that it is difficult to make sure Dm while making sure the power (refracting power) of the rear group.

Exceeding the upper limit of 40 to Condition (5) is not preferable, partly because the positive lens nearest to the eye point grows large, and partly because the amount of aberrations produced of the peripheral light beams grows large. This is also not preferable because even with Dm gained, it is difficult to make sure performance.

For the viewfinder here, it is preferable to satisfy the following condition (6).

$$13.5 \text{ mm} < f < 45 \text{ mm} \quad (6)$$

Here f is the focal length in mm of the whole eyepiece optical system.

Being short of the lower limit of 13.5 to Condition (6) is not preferable because the eye point distance gets short.

Exceeding the upper limit of 45 to Condition (6) is not preferable because the whole optical system length grows long.

For the viewfinder here, it is preferable to satisfy the following condition (7).

$$0.08 < \tan \theta \times EP/f < 1.6 \quad (7)$$

Here θ is the maximum angle of field,
EP is the eye point distance, and
f is the focal length of the whole eyepiece optical system.

As the lower limit of 0.08 to Condition (7) is not reached, it causes the angle of field to become small, and the eye point distance to become short as well. This is not preferable because difficulty is encountered in separation between the light beams near the center axis and at the periphery, resulting in difficulty in offering a sensible tradeoff between center performance and peripheral performance. This is also not preferable for the reason that it is difficult to make sure Dm.

As the upper limit of 1.6 to Condition (7) is exceeded, it causes the focal length of the whole eyepiece optical system to become short. This is not preferable because the eye point distance and the power of the positive lens nearest to the eye point are ill balanced with the result that peripheral performance is likely to deteriorate.

For the viewfinder here, it is preferable to satisfy the following conditions (8) and (9).

$$0.85 < f1/f < 3 \quad (8)$$

$$0 < (r-r')/(r+r') < 30 \quad (9)$$

Here f1 is the focal length of the rear group,
f is the focal length of the whole eyepiece optical system,
r is the radius of curvature of the lens surface located in the rear group and on the reflection type display device side, and
r' is the radius of curvature of the lens surface located in the rear group and on the eye point side.

As the lower limit of 0.85 to Condition (8) is not reached, it causes the focal length of the rear group to become short, producing large aberrations. This is not preferable because difficulty is encountered in correcting the produced aberrations.

As the upper limit of 3 to Condition (8) is exceeded, it causes the outer diameter of the eyepiece optical system to grow large. It also causes the amount of aberrations produced at the eyepiece optical system to grow large. This is not preferable because difficulty is encountered in offering a sensible tradeoff between correction of chromatic aberrations and correction of monochromatic off-axis aberrations.

As the lower limit of 0 to Condition (9) is not reached, the curvature of the lens surface located in the rear group and on the reflection type display device side grows tight. In this case, the principal points lie on the reflection type display device side, and a principal point space with the cemented lens becomes short. It is less likely to make sure Dm. This is not preferable because difficulty is encountered in the balance of astigmatism or coma in particular.

As the upper limit of 30 to Condition (9) is exceeded, the curvature of the lens surface located in the rear group and on the eye point side grows tight. This is not preferable because aberrations of peripheral light beams such as coma are more produced.

In the viewfinder here, it is preferable that the rear group has positive refracting power.

By allowing the rear group to have positive refracting power, it is possible to make sure an adequate eye point and a wide angle of field.

In the viewfinder here, it is preferable that the eyepiece optical system has a cemented lens.

With the cemented lens, it is possible to correct chromatic aberrations.

In the viewfinder here, it is preferable that the front group has a cemented lens.

By allowing the front group to have a cemented lens, it is possible to make better correction of chromatic aberrations.

In the viewfinder here, it is preferable that the cemented lens consists of, in order from the reflection type display device side, a negative lens and a positive lens.

If the cemented lens is composed of, in order from the reflection type display device side, a negative lens and a positive lens, it is then possible to correct chromatic aberrations, and achieve size reductions.

In the viewing optical system here, it is preferable that the eyepiece optical system comprises a cemented lens with the satisfaction of the following condition (10).

$$-8 < r3/f < -0.2 \quad (10)$$

Here r3 is the radius of curvature of the lens surface positioned in the cemented lens and nearest to the reflection type display device side, and
f is the focal length of the whole eyepiece optical system.

Colors are corrected at the negative and positive lenses, and an adequate eye point and a wide angle of field are achievable at the positive lens. The satisfaction of Condition (10) allows for satisfactory correction of aberrations.

As the lower limit of −8 to Condition (10) is not reached, there is an increasing load of the rear group positioned nearest to the eye point side on correction of aberrations. This is not preferable, because field curvature in particular or the like goes worse.

As the upper limit of −0.2 to Condition (10) is exceeded, it causes the radius of curvature of the cemented lens on the reflection type display device side to grow tight or become small. This is not preferable, because astigmatism and coma go worse.

More preferably for correction of aberrations, the lower limit of Condition (10) should be set at −6, and especially at −4.

For the viewfinder here, it is preferable the eyepiece optical system comprises a cemented lens including a negative lens, and satisfy the following condition (11).

$$-0.68 < fj/f < -0.15 \quad (11)$$

Here fj is a combined focal length of lenses between the reflection type display device and the negative lens, and
f is the focal length of the whole eyepiece optical system.

When there is a lens between the reflection type display device and the cemented lens, fj is going to represent the combined focal length of that lens and the negative lens in the cemented lens. When there is no lens between the reflection type display device and the cemented lens, fj is going to represent the focal length of the negative lens in the cemented lens.

As the lower limit of −0.68 to Condition (11) is not reached, it causes the power of the whole optical system to grow too strong. This is not preferable, because the contour of the optical system grows large.

As the upper limit of −0.15 to Condition (11) is exceeded, it causes the power of the whole optical system to become too weak. This is not preferable because not only does the whole length of the optical system grow long, but also chromatic aberrations cannot well be corrected.

Preferably in the viewfinder here, the eyepiece optical system consists of, in order from the reflection type display device side, a negative lens, a positive lens and a positive lens.

Thus, if the eyepiece optical system is composed of three lenses, it is then possible to make sure spaces for optical devices, the eye point, the field of view and performance.

For the viewfinder here, it is preferable that a movable lens is located on an eye point side with respect to the widest lens-to-lens space.

This allows for reductions in the amount of movement of the whole optical system, and enables diopter adjustment to be implemented while changes in aberrations and magnification remain minimized.

With the embodiments here, it is possible to obtain a compact yet high-performance viewfinder, and an imaging apparatus using the same, as described above.

Some examples of the invention are now explained with reference to the drawings.

Figure 1:
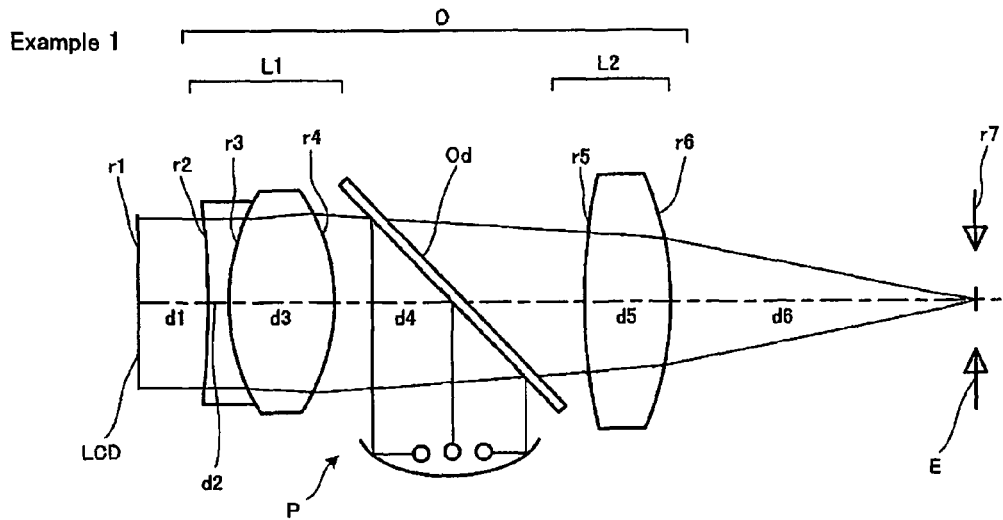
FIG. 1 is illustrative of Example 1 of the inventive viewfinder.

FIG. 1 is illustrative in section along the optical axis of the optical arrangement of the first example of the inventive viewfinder.

The viewfinder according to the first example comprises a reflection type display device LCD where an object image is displayed, an eyepiece optical system O and an illumination optical system P.

The eyepiece optical system O is made up of, in order from the reflection type display device LCD side, a first lens component L1 as the front group, an optical device Od and a second lens component L2 as the rear group. The first lens component L1 here consists of a cemented lens of a double-concave negative lens and a double-convex positive lens. The optical device Od is a plane-parallel plate, for instance, a half mirror. The second lens component L2 consists of a double-convex positive lens. In Example 1, the widest lens-to-lens space is defined by a space between the first lens component L1 and the second lens component L2: the optical device Od is located between the first lens component L1 and the second lens component L2.

The optical device Od is located such that the optical surface (half mirror surface) has a tilt of 45 degrees with respect to the optical axis of the eyepiece optical system. This provides an optical path orthogonal to an optical path taken by the eyepiece optical system. This optical path is provided for the illumination optical system P. On the optical path taken by the illumination optical system, the illumination optical system P and a light source are located.

On an optical path from the optical device Od to the reflection type display device LCD, illuminating light travels from the optical device Od toward the reflection type display device LCD. On this optical path, viewing light or illuminating light travels from the reflection type display device toward the optical device Od. Thus, the optical device Od acts to put the optical path taken by the illumination optical system P that illuminates the reflection type display device LCD with light leaving the light source over the optical path from the reflection type display device LCD to the viewing optical system O.

Figure 2:
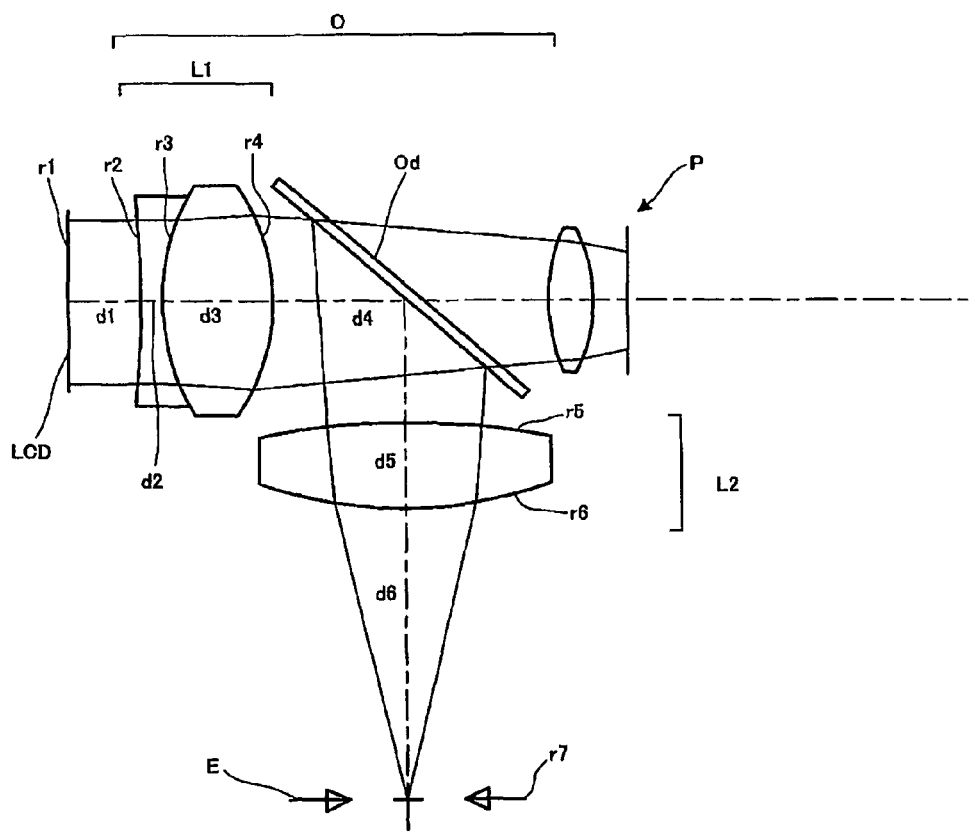
FIG. 2 is illustrative of one modification to Example 1 of the inventive viewfinder.

FIG. 2 is illustrative of one modification to the first example. In this modification, an optical path taken by the eyepiece optical system is bent 90°. To form such an optical path, the optical device Od is located in the optical path. Note here that in the modification of FIG. 2, too, the widest lens-to-lens space is defined between the first lens component L1 and the second lens component L2, and the illumination optical system is positioned in opposition to the reflection type display device with the optical device Od sandwiched between them. In this modification, therefore, the optical path taken by the illumination optical system assumes on a straight line.

FIG. 3 is illustrative in section along the optical axis of the optical arrangement of the second example of the inventive viewfinder.

The viewfinder according to the second example comprises a reflection type display device LCD where an object image is displayed, an eyepiece optical system O and an illumination optical system P.

The eyepiece optical system O is made up of, in order from the reflection type display device LCD side, a first lens component L1 as the front group, an optical device Od and a second lens component L2 as the rear group. The first lens component L1 here consists of a cemented lens of a double-concave negative lens and a double-convex positive lens. The optical device Od is a plane-parallel plate, for instance, a half mirror. The second lens component L2 consists of a double-convex positive lens. In Example 2, the widest lens-to-lens space is defined between the first lens component L1 and the second lens component L2: the optical device Od is located between the first lens component L1 and the second lens component L2.

Figure 3A:
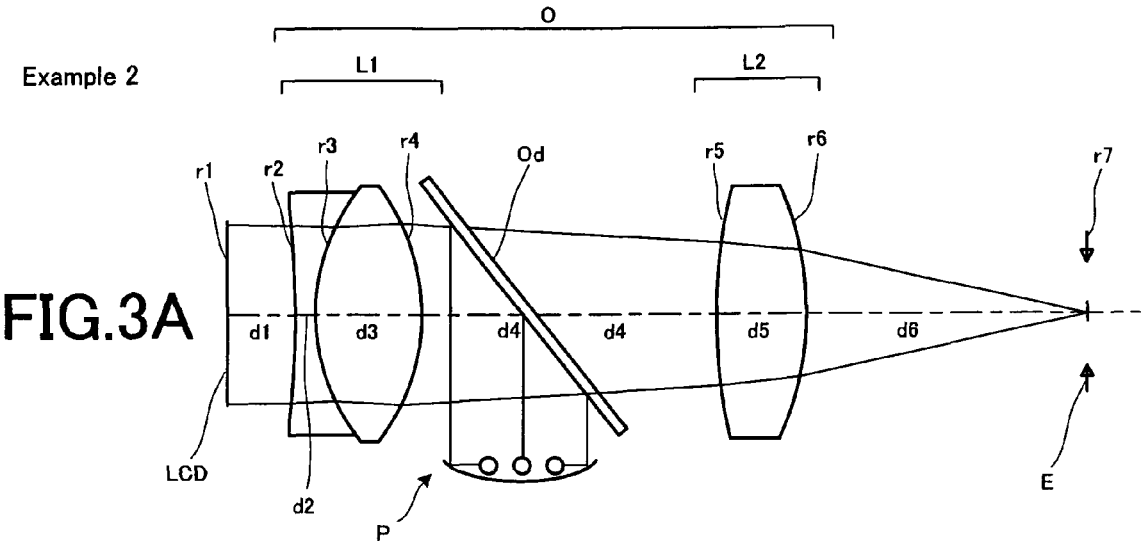
FIG. 3 is illustrative of Example 2 of the inventive viewfinder.
Figure 3B:
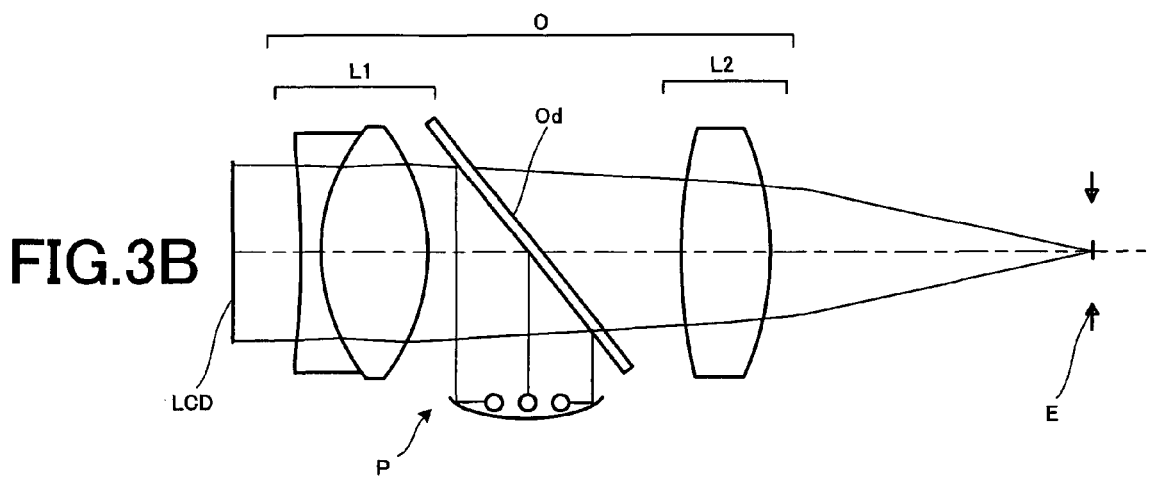
Figure 3C:
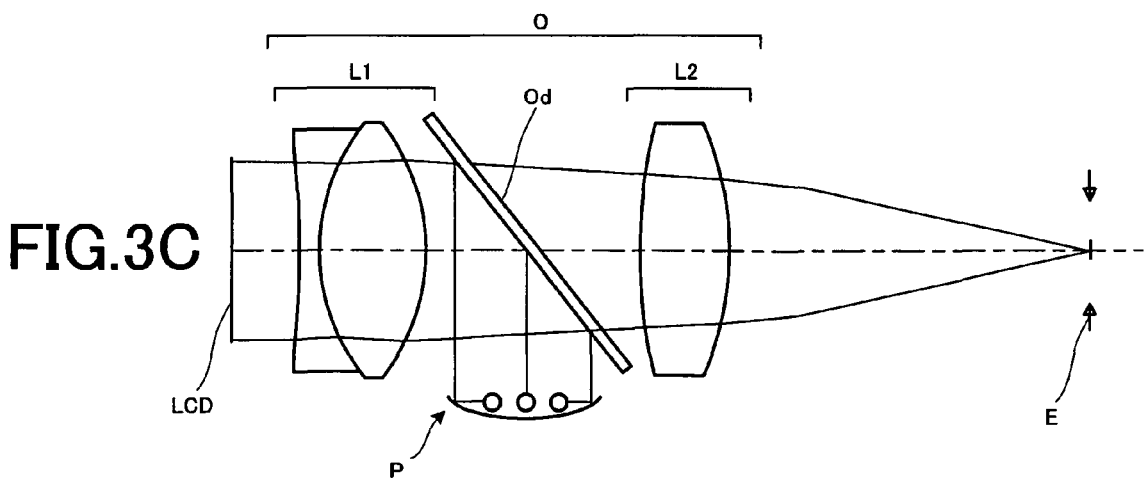

Example 2 is designed such that a lens in the eyepiece optical system O is movable. Specifically, it is the positive lens positioned nearest to the eye point side; in the example here, it is the second lens component L2. FIGS. 3(a), 3(b) and 3(c) are illustrative of the optical arrangement at a diopter of 1 m$^{-1}$, −1 m$^{-1}$, and −3 m$^{-1}$, respectively.

To enable diopter to be corrected, the eyepiece optical system O may be designed such that the whole or a part of it is movable. When a part of the optical system is designed to be movable, the immovable or fixed portion has a dustproof effect on the reflection type display device. There may further be a cover glass provided on the eye point side. Note here that the above viewfinder may be used as an electronic viewfinder because of using the reflection type display device.

Numerical data on Examples 1 and 2 will be set out below together with the values of all the conditions.

Referring to the numerical data on and the values of Examples 1 and 2, r is the radius of curvature of each lens surface, d is the surface-to-surface space of each lens, n is the refractive index of each lens, and ν is the Abbe constant of each lens, with r for the image plane being indicative of the radius of curvature.

Numerical Example 1 in mm

| Surface Data | | | | | |
|---|---|---|---|---|---|
| Surface No. | r | d | n | νd | Effective Diameter |
| 1 (Reflection Type Display Device) | ∞ | variable | | | 17.74 |
| 2 | −89.444 | 1.50 | 1.80518 | 25.42 | 17.72 |
| 3 | 18.127 | 7.97 | 1.51633 | 64.14 | 18.09 |
| 4 | −18.300 | 19.07 | | | 19.06 |
| 5 | 50.973 | 6.64 | 1.48749 | 70.23 | 16.89 |
| 6 | −28.519 | variable | | | 16.05 |
| 7 (Virtual Stop) | ∞ | | | | |

| Amount of Change | | | |
|---|---|---|---|
| Diopter (m$^{-1}$) | +1 | −1 | −3 |
| d1 | 7.12 | 5.22 | 3.42 |
| d6 | 21.10 | 23.00 | 24.80 |

| Various Data | | | |
|---|---|---|---|
| Diopter (m$^{-1}$) | +1 | −1 | −3 |
| Angle of Field | 32.64° | 32.90° | 32.98° |
| Total Length | 42.30 | 40.40 | 38.60 |
| Entrance Pupil Position | 183.06 | 272.67 | 513.20 |

Focal Length: 31.4

Front Principal Point Position: 24.53

Rear Principal Point Position: −2.16

Object Height: 8.88

Focal Length of the Lenses

First Lens Component: 141.18

First Lens Component Negative Lens: −18.60

First Lens Component Positive Lens: 19.06
Second Lens Component: 38.57

Numerical Example 2 in mm

Surface Data

| Surface No. | r | d | n | vd | Effective Diameter |
|---|---|---|---|---|---|
| 1 (Reflection Type Display Device) | ∞ | 5.22 | | | 17.74 |
| 2 | −89.444 | 1.50 | 1.80518 | 25.42 | 17.72 |
| 3 | 18.127 | 7.97 | 1.51633 | 64.14 | 18.09 |
| 4 | −18.300 | variable | | | 19.06 |
| 5 | 50.973 | 6.64 | 1.48749 | 70.23 | 16.89 |
| 6 | −28.519 | variable | | | 16.05 |
| 7 (Virtual Stop) | ∞ | | | | |

Amount of Change

| Diopter (m$^{-1}$) | +1 | −1 | −3 |
|---|---|---|---|
| d4 | 22.07 | 19.07 | 16.17 |
| d6 | 21.10 | 24.00 | 26.90 |

Various Data

| Diopter (m$^{-1}$) | +1 | −1 | −3 |
|---|---|---|---|
| Angle of Field | 31.90° | 32.88° | 33.32° |
| Total Length | 38.18 | 35.18 | 32.28 |
| Entrance Pupil Position | 132.90 | 206.80 | 512.31 |
| Focal Length | 31.23 | 30.70 | 30.21 |
| Front Principal Point Position | 8.35 | 8.48 | 8.51 |
| Rear Principal Point Position | 38.18 | 35.18 | 32.28 |

Object Height: 8.88

Focal Length of the Lenses
First Lens Component: 141.18
First Lens Component Negative Lens: −18.60
First Lens Component Positive Lens: 19.06
Second Lens Component: 38.57

| Condition | Ex. 1 | Ex. 2 |
|---|---|---|
| (1) | 0.47 | 0.40~0.55 |
| (2) | 0.53~0.69 | 0.53~0.69 |
| (3) | 1.0~2.8 | 1.8~5.8 |
| (4) | 32.6 | 31.8~33.8 |
| (5) | 23.0 | 23.0 |
| (6) | 30.7 | 30.2~31.2 |
| (7) | 0.19 | 0.18~0.20 |
| (8) | 1.26 | 1.24~1.28 |
| (9) | 3.5 | 3.5 |
| (10) | −0.83 | −2.86~−2.96 |
| (11) | −0.48 | −0.60~−0.62 |

Figure 4:
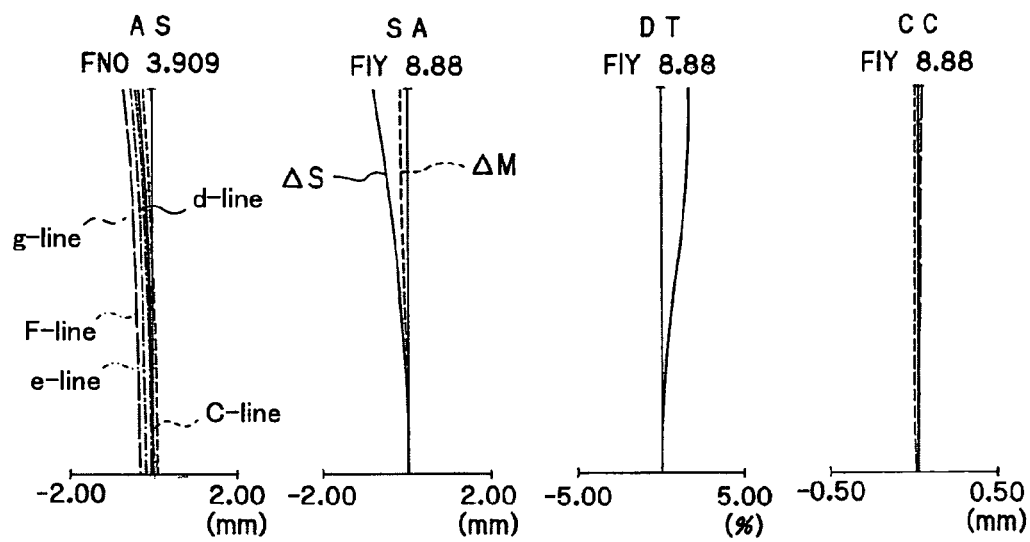
FIG. 4 is an aberration diagram for the viewfinder of Example 1.
Figure 4:
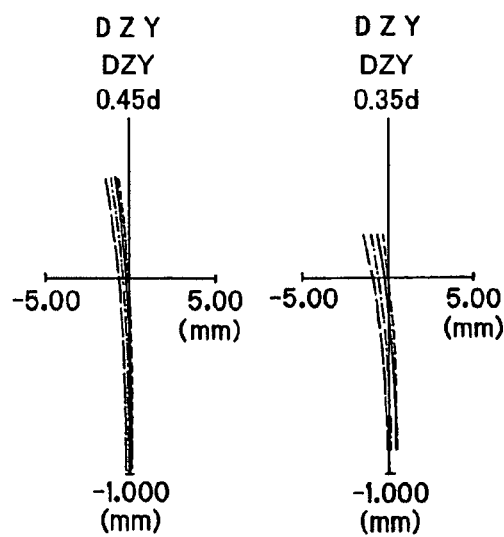

The aberration diagrams for Example 1 is presented in FIG. 4, wherein SA, AS, DT, DZY, FNO and FIY are indicative of spherical aberrations, astigmatism, distortion, coma, an F-number and an image height, respectively.

Figure 5:
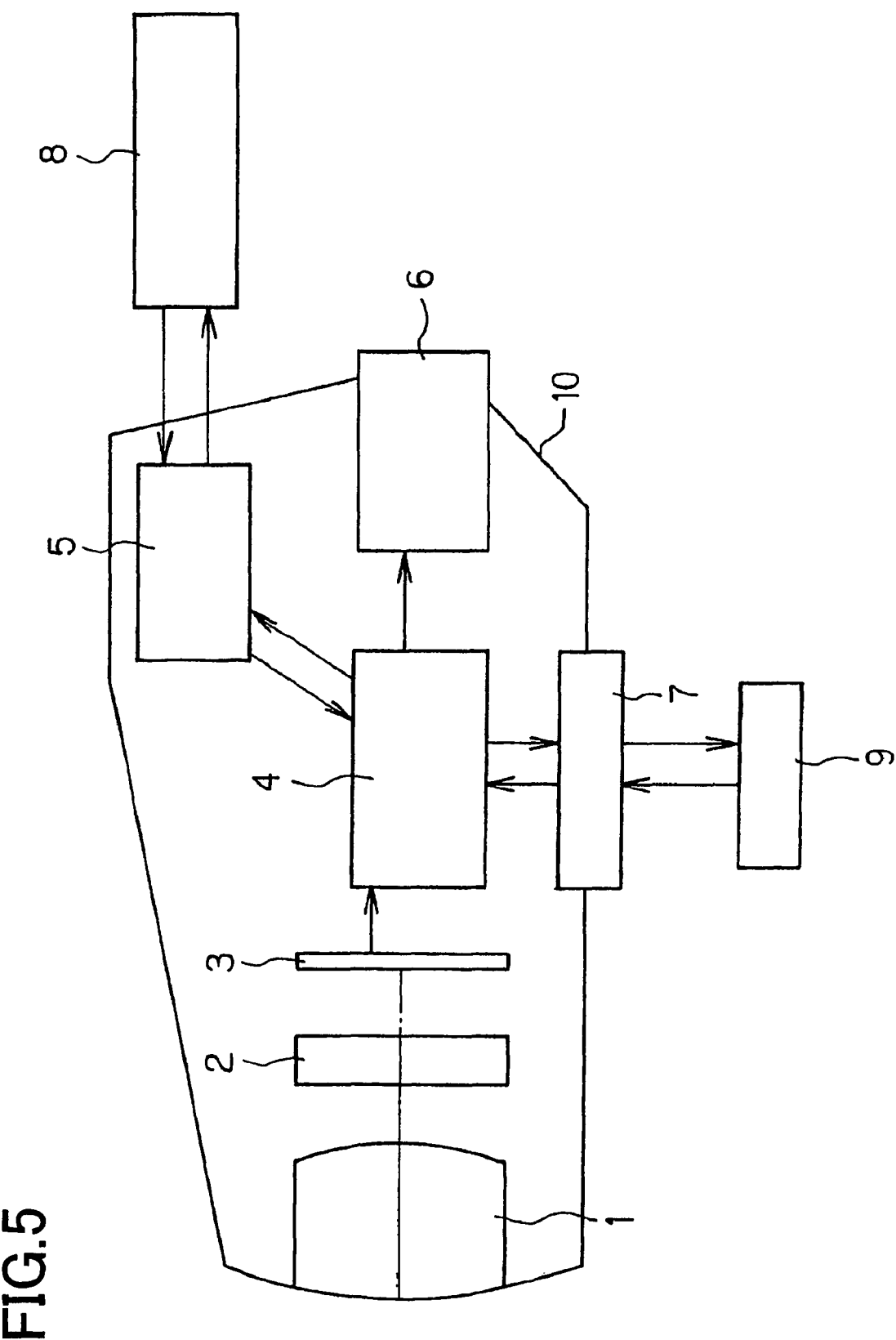
FIG. 5 is illustrative in construction of a digital camera that is one exemplar of the inventive imaging apparatus.

FIG. 5 is illustrative of the arrangement of a digital camera that is one exemplar of the inventive imaging apparatus. In FIG. 5, reference numeral 10 is a digital camera that is an imaging apparatus comprising an imaging optical system 1, a filter 2, an imaging device 3, a controller 4, a built-in memory 5, an electronic viewfinder 6 and an interface 7.

In the above imaging apparatus, the imaging optical system 1 is built up of a plurality of optical elements (such as lenses). Light coming out of an object is collected by this imaging optical system 1, and an object image is formed at this light collection position. And at this light collection position the imaging device 3 (light receiving plane) such as a CCD is located. The imaging device 3 is made up of an array of regularly arranged photoelectric elements. To prevent the moiréphenomenon, the filter 2 having a low-pass effect is located between the imaging optical system 1 and the imaging device 3. There may also be an infrared cut filter provided to cut off infrared light.

A light beam incident onto the imaging device 3 is converted by the photoelectric elements into electric (image) signals. The electric signals are entered in the controller 4 where signal processing such as gamma correction and image compression is applied to the electric signals. The electric signals to which signal processing has been applied are sent out to a personal computer 9 or the like via the built-in memory 5 and interface 7.

The electronic viewfinder 6 is made up of an illumination system, an image display device (not shown in FIG. 5), an eyepiece optical system (eyepiece lens), and so on. The inventive viewing optical system O is used for the eyepiece optical system here, and an image display device is located on the viewing plane D. This image display device is controlled by the controller 4. The electronic viewfinder 6 of such arrangement enables the viewer to view an image taken, or being taken, of an object. Image data may be forwarded from the built-in memory 5 to an auxiliary memory 8. On the other hand, the same image data may be forwarded from the interface 7 to the personal computer 9.

Figure 6:
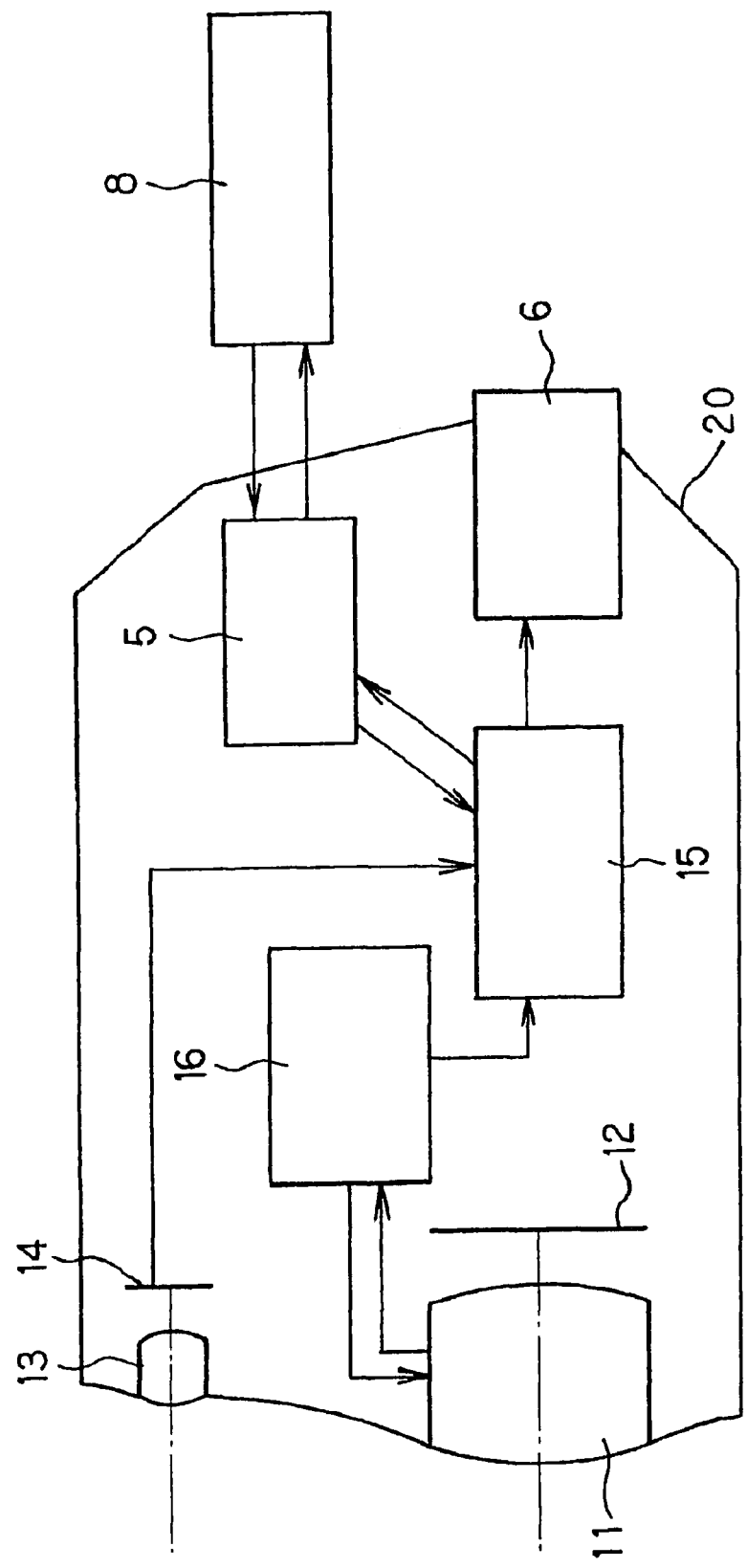
FIG. 6 is illustrative in construction of the inventive imaging apparatus applied to a silver-halide camera.

FIG. 6 is illustrative of the arrangement of a silver-halide camera to which the inventive imaging apparatus is applied. As shown in FIG. 6, a silver-halide camera 20 comprises an imaging optical system 11, a film 12, an objective lens 13, an imaging device 14 such as a CCD, a first controller 15, and a second controller 16. Further, there are a built-in memory 5 and an electronic viewfinder 6 provided as is the case with the digital camera of FIG. 5. Note here that the imaging optical system 11 and the objective lens 13 are different optical systems, as shown.

With the silver-halide camera 20 shown in FIG. 6, a light beam coming out of an object is collected by the imaging optical system 11, and an object image is formed on this light collection position (first light collection position). The film 12 is located at the first light collection position. A light beam coming out of the object is collected by the objective lens 13, and an object image is formed at this light collection position (second light collection position). The imaging device 14 such as a CCD is located at the second light collection position. The imaging device 14 is made up of an array of regularly arranged photoelectric elements.

A light beam incident onto the imaging device 14 is converted by the photoelectric elements into electric signals (image signals). The electric signals are then entered in the first controller 15 where signal processing such as gamma correction and image compression is applied to them. The electric signals to which signal processing has been applied are sent out to the image display device. As described above, the electronic viewfinder 6 is constructed of an illumination system, an image display device, an eyepiece optical system (eyepiece lens), and so on. The inventive viewing optical system O is used for the eyepiece optical system here. Via the electronic viewfinder 6, the viewer can view an object being taken of an object.

On the other hand, the user (viewer) can view the taken images, using information or the like stored in the built-in memory 5. Such control is implemented by the first controller 15.

For the purpose of controlling the imaging optical system 11, there is the second controller 16 provided. The second controller 16 lets the imaging optical system 11 implement operations such as zooming and focusing. Information for zooming, focusing or the like is recognized by the first controller 15 based on signals from the second controller 16. By virtue of this recognition, the first controller 15 can work and adjust the image to be displayed on the image display device in conformity with the taking angle of view (zooming). On the basis of information for focusing or the like, the range of the images displayed on the display device may be corrected (parallax correction). Signals from the first controller 15 may also be sent out to the built-in memory 5 or an interface (not shown). Then, these signals (information) may be produced out to a personal computer or the like via the interface.

An optical path-splitting device may be located between the imaging optical system 11 and the film 12. A light beam out of the object may be guided to the finder via that optical path-splitting device to form an object image on the imaging device 14. And viewing may be implemented on the basis of this object image. In this case, it is not necessary to use the objective lens 13.

What we claim is:

1. A viewfinder, characterized by comprising:
   a reflection type display device on which an object image is displayed,
   an eyepiece optical system having a front group and a rear group,
   an illumination optical system for illuminating said reflection type display device, and
   an optical device for putting an optical path taken by said illumination optical system over an optical path from said reflection type display device to said eyepiece optical system at a position of the widest of lens-to-lens spaces in said eyepiece optical system, wherein said eyepiece optical system is located between said reflection type display device and an eye point, and satisfies the following condition (1):

$$0.1 < Y/Dm < 1 \quad (1)$$

where Dm is said widest lens-to-lens space, and
Y is a length of said reflection type display device from a center to one side thereof.

2. The viewfinder according to claim 1, characterized in that lenses forming said eyepiece optical system comprise coaxial lenses.

3. The viewfinder according to claim 1, characterized in that said front group comprises lenses positioned on a reflection type display device side with respect to said optical device, and satisfies the following condition (2):

$$0.1 < Ymax/d < 1.5 \quad (2)$$

where d is a distance between said reflection type display device and a lens surface located in said front group and nearest to said optical device side, and Ymax is half a diagonal length of said reflection type display device).

4. The viewfinder according to claim 1, characterized by satisfying the following condition (3):

$$0° < \epsilon h < 20° \quad (3)$$

where $\epsilon h$ is an exit angle (°) of a farthest off-axis chief ray on said reflection type display device provided that said farthest off-axis chief ray is the outermost of off-axis chief rays that intersect an optical axis of said eyepiece optical system at a given position that is 20 mm spaced away from a lens surface located in said eyepiece optical system and nearest to said eye point side toward said eye point side.

5. The viewfinder according to claim 1, characterized by satisfying the following condition (4):

$$30 < \tan^{-1}(Y2/f) < 47 \quad (4)$$

where Y2 is a diagonal length of said reflection type display device, and
f is a focal length of the whole eyepiece optical system.

6. The viewfinder according to claim 1, characterized by satisfying the following condition (5):

$$13 \text{ mm} < EP < 40 \text{ mm} \quad (5)$$

where EP is an eye point distance that is a distance in mm from a lens surface located in said eyepiece optical system and nearest to said eye point side to said eye point.

7. The viewfinder according to claim 1, characterized by satisfying the following condition (6):

$$13.5 \text{ mm} < f < 45 \text{ mm} \quad (6)$$

where f is a focal length of the whole eyepiece optical system.

8. The viewfinder according to claim 1, characterized by satisfying the following condition (7):

$$0.08 < \tan\theta \times EP/f < 1.6 \quad (7)$$

where θ is a maximum angle of field,
EP is said eye point distance, and
f is a focal length of the whole eyepiece optical system.

9. The viewfinder according to claim 1, characterized by satisfying the following conditions (8) and (9):

$$0.85 < f1/f < 3 \quad (8)$$

$$0 < (r-r')/(r+r') < 30 \quad (9)$$

where f1 is a focal length of said rear group,
f is a focal length of the whole eyepiece optical system,
r is a radius of curvature of a lens surface located in said rear group and on said reflection type display device side, and
r' is a radius of curvature of a lens surface located in said rear group and on said eye point side.

10. The viewfinder according to claim 1, characterized in that said rear group has positive refracting power.

11. The viewfinder according to claim 1, characterized in that said eyepiece optical system comprises a cemented lens.

12. The viewfinder according to claim 1, characterized in that said front group comprises a cemented lens.

13. The viewfinder according to claim 12, characterized in that said cemented lens consists of, in order from said reflection type display device side, a negative lens and a positive lens.

14. The viewfinder according to claim 1, characterized in that said eyepiece optical system comprises a cemented lens, and satisfies the following condition (10):

$$-8 < r3/f < -0.2 \quad (10)$$

where r3 is a radius of curvature of a lens surface positioned in said cemented lens and nearest to said reflection type display device side, and f is a focal length of the whole eyepiece optical system.

15. The viewfinder according to claim 1, characterized in that said eyepiece optical system comprises a cemented lens including a negative lens, with satisfaction of the following condition (11):

$$-0.68 < fj/f < -0.15 \qquad (11)$$

where fj is a combined focal length of lenses between said reflection type display device and said negative lens, and f is a focal length of the whole eyepiece optical system.

16. The viewfinder according to claim 1, characterized in that said eyepiece optical system consists of, in order from said reflection type display device side, a negative lens, a positive lens and a positive lens.

17. The viewfinder according to claim 1, characterized in that a movable lens is located on an eye point side with respect to said widest lens-to-lens space.

18. An imaging apparatus, characterized by comprising an imaging device, a controller adapted to convert image information obtained from said imaging device into displayable signals, and a viewfinder adapted to guide an image displayed on said image display device to a viewer's eye, wherein the viewfinder according to claim 1 is used as said viewfinder.

* * * * *